US010424778B2

(12) United States Patent
Mochizuki et al.

(10) Patent No.: US 10,424,778 B2
(45) Date of Patent: Sep. 24, 2019

(54) MATERIAL FOR POSITIVE ELECTRODE, ELECTRODE SHEET FOR ALL-SOLID STATE SECONDARY BATTERY, ALL-SOLID STATE SECONDARY BATTERY, AND METHODS FOR MANUFACTURING ELECTRODE SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Hiroaki Mochizuki, Kanagawa (JP); Tomonori Mimura, Kanagawa (JP); Masaomi Makino, Kanagawa (JP); Katsuhiko Meguro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/828,558

(22) Filed: Dec. 1, 2017

(65) Prior Publication Data

US 2018/0090748 A1 Mar. 29, 2018

Related U.S. Application Data

(63) Continuation of application No. PCT/JP2016/065558, filed on May 26, 2016.

(30) Foreign Application Priority Data

Jun. 2, 2015 (JP) .................................. 2015-112324

(51) Int. Cl.
*H01M 4/1315* (2010.01)
*H01M 4/13* (2010.01)
(Continued)

(52) U.S. Cl.
CPC ....... *H01M 4/1315* (2013.01); *H01M 4/0404* (2013.01); *H01M 4/13* (2013.01);
(Continued)

(58) Field of Classification Search
CPC .. H01M 4/1315; H01M 4/13915; H01M 4/62; H01M 4/621; H01M 10/0525; H01M 10/0562
See application file for complete search history.

(56) References Cited

U.S. PATENT DOCUMENTS

| 2012/0115039 A1* | 5/2012 | Ouchi | H01M 4/0471 |
| | | | 429/304 |
| 2013/0143128 A1* | 6/2013 | Mochida | H01M 4/131 |
| | | | 429/304 |

FOREIGN PATENT DOCUMENTS

| JP | 2000-149924 A | 5/2000 |
| JP | 2006-164783 A | 6/2006 |

(Continued)

OTHER PUBLICATIONS

Communication dated Sep. 4, 2018 from the Japanese Patent Office in counterpart Application No. 2017-521873.

(Continued)

*Primary Examiner* — Karie O'Neill Apicella
(74) *Attorney, Agent, or Firm* — Sughrue Mion, PLLC

(57) ABSTRACT

A material for a positive electrode containing: a positive electrode active material, an inorganic solid electrolyte having conductivity of ions of metals belonging to Group I or II of the periodic table; an auxiliary conductive agent; and a dispersant including a compound having at least one selected from a group of functional groups (I), an electrode sheet for an all-solid state secondary battery and an all-solid state secondary battery for which the material for a positive electrode is used, and methods for manufacturing an electrode sheet for an all-solid state secondary battery and an all-solid state secondary battery. Group of functional groups (I): acidic groups, (meth)acryloyl groups, (meth)acryloyloxy groups, (meth)acrylamide groups, alkoxysilyl groups, epoxy (Continued)

groups, oxetanyl groups, isocyanate groups, cyano groups, and mercapto groups.

12 Claims, 1 Drawing Sheet

(51) Int. Cl.
    *H01M 4/62*         (2006.01)
    *H01M 10/0562*     (2010.01)
    *H01M 4/13915*     (2010.01)
    *H01M 10/0525*     (2010.01)
    *H01M 4/04*         (2006.01)
    *H01M 4/139*       (2010.01)
    *H01M 4/02*         (2006.01)

(52) U.S. Cl.
    CPC ....... *H01M 4/139* (2013.01); *H01M 4/13915* (2013.01); *H01M 4/62* (2013.01); *H01M 4/621* (2013.01); *H01M 4/625* (2013.01); *H01M 10/0525* (2013.01); *H01M 10/0562* (2013.01); *H01M 2004/028* (2013.01)

(56) References Cited

FOREIGN PATENT DOCUMENTS

| | | |
|---|---|---|
| JP | 2013-008611 A | 1/2013 |
| WO | 2011/132627 A1 | 10/2011 |
| WO | 2012/026480 A1 | 3/2012 |
| WO | 2013/146896 A1 | 10/2013 |

OTHER PUBLICATIONS

International Search Report dated Aug. 30, 2016, in counterpart International Application No. PCT/JP2016/065558.

International Preliminary Report on Patentability with translation of Written Opinion dated Dec. 5, 2017, in counterpart International Application No. PCT/JP2016/065558.

* cited by examiner

MATERIAL FOR POSITIVE ELECTRODE, ELECTRODE SHEET FOR ALL-SOLID STATE SECONDARY BATTERY, ALL-SOLID STATE SECONDARY BATTERY, AND METHODS FOR MANUFACTURING ELECTRODE SHEET FOR ALL-SOLID STATE SECONDARY BATTERY AND ALL-SOLID STATE SECONDARY BATTERY

CROSS-REFERENCE TO RELATED APPLICATIONS

This application is a Continuation of PCT International Application No. PCT/JP2016/065558 filed on May 26, 2016, which claims priority under 35 U.S.C. § 119 (a) to Japanese Patent Application No. 2015-112324 filed in Japan on Jun. 2, 2015. Each of the above applications is hereby expressly incorporated by reference, in its entirety, into the present application.

BACKGROUND OF THE INVENTION

1. Field of the Invention

The present invention relates to a material for a positive electrode, an electrode sheet for an all-solid state secondary battery, an all-solid state secondary battery, and methods for manufacturing an electrode sheet for an all-solid state secondary battery and an all-solid state secondary battery.

2. Description of the Related Art

For lithium ion batteries, electrolytic solutions have been used. Attempts are underway to produce all-solid state secondary batteries in which all constituent materials are solid by replacing electrolytic solutions with solid electrolytes. Reliability in terms of all performance of batteries is an advantage of techniques of using inorganic solid electrolytes. For example, to electrolytic solutions being used for lithium ion secondary batteries, flammable materials such as carbonate-based solvents are applied as media. In secondary batteries in which the above-described electrolytic solutions are used, a variety of safety measures are employed. However, there may be a concern that disadvantages may be caused during overcharging and the like, and there is a demand for additional efforts. All-solid state secondary batteries in which non-flammable electrolytes can be used are considered as a fundamental solution therefor.

Another advantage of all-solid state secondary batteries is the suitability for increasing energy density by means of the stacking of electrodes. Specifically, it is possible to produce batteries having a structure in which electrodes and electrolytes are directly arranged in series. At this time, metal packages sealing battery cells and copper wires or bus-bars connecting battery cells may not be provided, and thus the energy density of batteries can be significantly increased. In addition, favorable compatibility with material for a positive electrode capable of increasing potentials and the like can also be considered as advantages.

Due to the respective advantages described above, all-solid state secondary batteries are being developed as next-generation lithium ion batteries (New Energy and Industrial Technology Development Organization (NEDO), Fuel Cell and Hydrogen Technologies Development Department, Electricity Storage Technology Development Section, "NEDO 2013 Roadmap for the Development of Next Generation Automotive Battery Technology" (August, 2013)). For example, JP2006-164783A describes a battery in which an electrode having an active material layer including an active material, a solid electrolyte, and solid electrolyte particles having a higher ion conductivity than the solid electrolyte and a collector laminated on the active material layer is used.

SUMMARY OF THE INVENTION

In the battery described in JP2006-164783A, an organic macromolecule such as polyethylene oxide is used as the solid electrolyte. In the battery described in JP2006-164783A, this organic macromolecule has ion conductivity and plays a role of a binder (binding agent). However, there is a concern that the organic macromolecule may excessively form coatings on the active material or the solid electrolyte particles, conversely, may impair ion conductivity, and may degrade battery performance such as discharge capacity and output characteristics.

Therefore, an object of the present invention is to provide a material for a positive electrode which is capable of realizing favorable discharge capacity and output characteristics in all-solid state secondary batteries, an electrode sheet for an all-solid state secondary battery and an all-solid state secondary battery for which the material for a positive electrode is used, and methods for manufacturing an electrode sheet for an all-solid state secondary battery and an all-solid state secondary battery.

The present inventors and the like carried out intensive studies in order to achieve the above-described object and completed the present invention.

That is, the present inventors and the like found that materials for a positive electrode which contain a positive electrode active material and an inorganic solid electrolyte and contain an auxiliary conductive agent and a dispersant including a compound having a functional group described below are excellent in terms of the dispersion stability of solid particles, in positive electrode active material layers produced using this material for a positive electrode, favorable interfaces are formed among solid particles that constitute the positive electrode active material layers, and, as a result, all-solid state secondary batteries including the positive electrode active material layer are capable of realizing favorable discharge capacity and output characteristics. The present invention is based on the above-described finding.

That is, the object is achieved by the following means.

<1> A material for a positive electrode comprising: a positive electrode active material; an inorganic solid electrolyte having conductivity of ions of metals belonging to Group I or II of the periodic table; an auxiliary conductive agent; and a dispersant including a compound having at least one selected from a group of functional groups (I).

Group of functional groups (I): acidic groups, (meth)acryloyl groups, (meth)acryloyloxy groups, (meth)acrylamide groups, alkoxysilyl groups, epoxy groups, oxetanyl groups, isocyanate groups, cyano groups, and mercapto groups.

<2> The material for a positive electrode according to <1>, in which a specific surface area of the auxiliary conductive agent is 50 m$^2$/g or less.

<3> The material for a positive electrode according to <1> or <2>, in which the auxiliary conductive agent is made of a carbon material, and a length Lc of a crystallite in a c-axis direction of the carbon material is 100 angstroms or more.

<4> The material for a positive electrode according to any one of <1> to <3>, in which 0.01% to 10% by mass of the auxiliary conductive agent is included.

<5> The material for a positive electrode according to any one of <1> to <4>, in which an average particle diameter of the auxiliary conductive agent is 0.1 to 50 µm.

<6> The material for a positive electrode according to any one of <1> to <5>, in which the inorganic solid electrolyte is a sulfide-based inorganic solid electrolyte.

<7> The material for a positive electrode according to any one of <1> to <6>, in which the compound having at least one selected from the group of functional groups (I) is a compound represented by General Formula (D) or a compound including a structure in which at least one hydrogen atom in the compound is substituted with a bond.

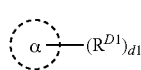

General Formula (D)

In General Formula (D), ring α represents a monocyclic or polycyclic ring, $R^{D1}$ represents a substituent bonded to a constituent atom of the ring α, and d1 represents an integer of 1 or more. In a case in which d1 is 2 or more, a plurality of $R^{D1}$'s may be identical to or different from each other. In addition, two $R^{D1}$'s substituting the same atom may be bonded to each other and thus form =O or an alkylidene group, and $R^{D1}$'s substituting atoms adjacent to each other may be bonded to each other and thus form a ring. Provided that, in a case in which an epoxy ring or an oxetane ring is not condensed into the ring α, at least one $R^{D1}$ is a functional group selected from the group of functional groups (I) or a group including the functional group.

<8> The material for a positive electrode according to <7>, in which the ring α is a condensed polycyclic hydrocarbon ring of three or more rings into which an epoxy ring or an oxetane ring may be condensed.

<9> The material for a positive electrode according to any one of <1> to <8>, in which 0.01% to 10% by mass of the dispersant is included with respect to the auxiliary conductive agent.

<10> An electrode sheet for an all-solid state secondary battery produced by applying the material for a positive electrode according to any one of <1> to <9> onto a metal foil.

<11> An all-solid state secondary battery comprising: a positive electrode active material layer; a negative electrode active material layer; and an inorganic solid electrolyte layer, in which the positive electrode active material layer is produced by applying the material for a positive electrode according to any one of <1> to <9> to form a layer.

<12> A method for manufacturing an electrode sheet for an all-solid state secondary battery, the method comprising: applying the material for a positive electrode according to any one of <1> to <9> onto a metal foil to form a film.

<13> A method for manufacturing an all-solid state secondary battery, the method comprising: manufacturing an all-solid state secondary battery through the manufacturing method according to <12>.

In the present specification, numerical ranges expressed using "to" include numerical values before and after the "to" as the lower limit value and the upper limit value.

In the present specification, when a plurality of substituents represented by specific symbols is present or a plurality of substituents or the like is simultaneously or selectively determined (similarly, when the number of substituents is determined), the respective substituents and the like may be identical to or different from each other. In addition, a plurality of substituents or the like approximates to each other, the substituents or the like may be bonded or condensed to each other and thus form a ring.

In the present specification, "acryl" that is simply expressed is used to refer to both methacryl and acryl.

All-solid state secondary batteries produced using the material for a positive electrode of the present invention have a large discharge capacity and exhibit an excellent effect of enabling the realization of favorable output characteristics. In addition, the electrode sheet for an all-solid state secondary battery of the present invention can be preferably manufactured using the material for a positive electrode of the present invention and can be used for the all-solid state secondary battery of the present invention exhibiting the above-described favorable performance. Furthermore, the methods for manufacturing an electrode sheet for an all-solid state secondary battery and an all-solid state secondary battery of the present invention can be preferably used to manufacture the electrode sheet for an all-solid state secondary battery and the all-solid state secondary battery.

The above-described and other characteristics and advantages of the present invention will be further clarified by the following description with appropriate reference to the accompanying drawings.

DESCRIPTION OF THE PREFERRED EMBODIMENTS

An all-solid state secondary battery of the present invention includes a positive electrode active material layer, a negative electrode active material layer, and an inorganic solid electrolyte layer. In the present invention, the positive electrode active material layer is formed using a material for a positive electrode containing a positive electrode active material, an inorganic solid electrolyte having conductivity of ions of metals belonging to Group I or II of the periodic table, an auxiliary conductive agent, and a dispersant including a compound having at least one selected from the group of functional group (I) described below.

Hereinafter, a preferred embodiment will be described.

Figure 1:
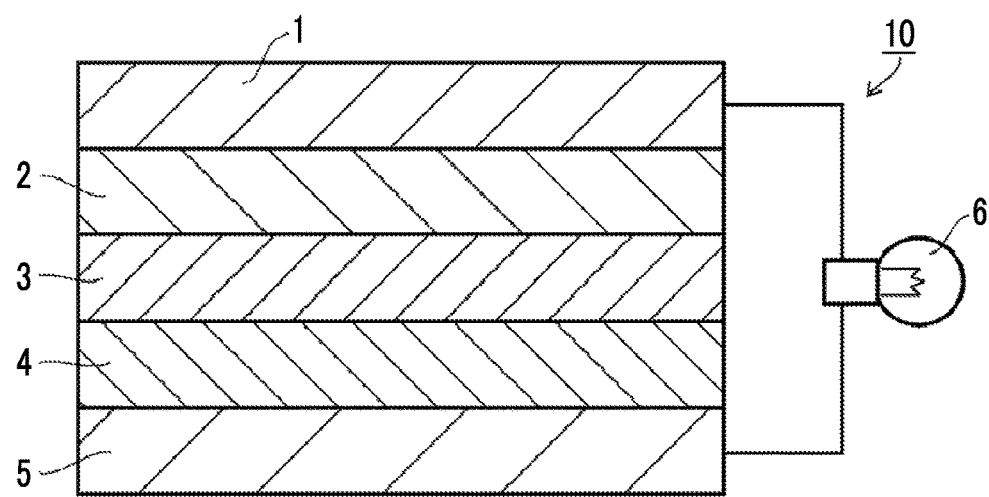
FIG. 1 is a vertical cross-sectional view schematically illustrating an all-solid state secondary battery according to a preferred embodiment of the present invention.
Figure 2:
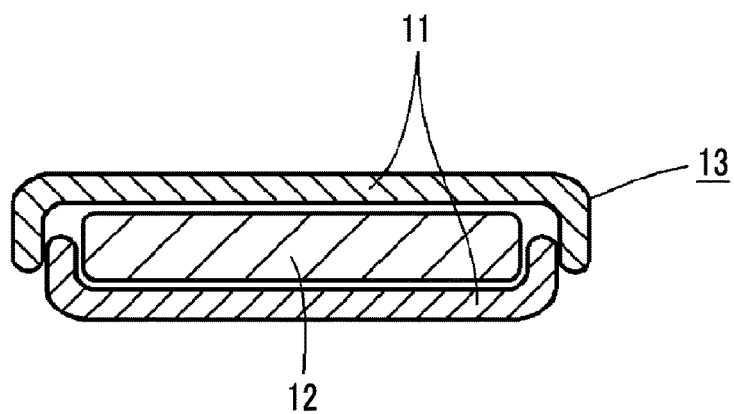
FIG. 2 is a vertical cross-sectional view schematically illustrating a testing device used in examples.

FIG. 1 is a cross-sectional view schematically illustrating an all-solid state secondary battery (lithium ion secondary battery) according to a preferred embodiment of the present invention. In the case of being seen from the negative electrode side, an all-solid state secondary battery 10 of the present embodiment has a negative electrode collector 1, a negative electrode active material layer 2, a solid electrolyte layer 3, a positive electrode active material layer 4, and a positive electrode collector 5 in this order. The respective layers are in contact with one another and have a laminated structure. In a case in which the above-described structure is employed, during charging, electrons (e⁻) are supplied to the negative electrode side, and lithium ions (Li⁺) are accumulated on the negative electrode side. On the other hand, during discharging, the lithium ions (Li⁺) accumulated on the negative electrode side return to the positive electrode, and electrons are supplied to an operation portion 6. In an example illustrated in the drawing, an electric bulb is employed as the operation portion 6 and is lit by discharging.

The thicknesses of the positive electrode active material layer 4, the solid electrolyte layer 3, and the negative electrode active material layer 2 are not particularly limited. Meanwhile, in a case in which the dimensions of ordinary batteries are taken into account, the thicknesses are preferably 10 to 1,000 μm and more preferably 20 μm or more and less than 500 μm. In the all-solid state secondary battery of the present invention, the thickness of at least one layer of the positive electrode active material layer 4, the solid electrolyte layer 3, and the negative electrode active material layer 2 is still more preferably 50 μm or more and less than 500 μm.

«Material for Positive Electrode»

Hereinafter, components contained in the material for a positive electrode of the present invention will be described. The material for a positive electrode of the present invention is preferably applied as a material used to form the positive electrode active material layer constituting the all-solid state secondary battery of the present invention.

In the present specification, in some cases, the positive electrode active material layer and the negative electrode active material layer will be referred to as the electrode layers. In addition, as electrode active materials that are used in the present invention, there are a positive electrode active material contained in the positive electrode active material layer and a negative electrode active material contained in the negative electrode active material layer, and there are cases in which either or both the positive electrode active material and the negative electrode active material will be simply referred to as the active materials.

(Inorganic Solid Electrolyte)

The inorganic solid electrolyte is an inorganic solid electrolyte, and the solid electrolyte refers to a solid-form electrolyte capable of migrating ions therein. The inorganic solid electrolyte is clearly differentiated from organic solid electrolytes (macromolecular electrolytes represented by PEO or the like and organic electrolyte salts represented by LiTFSI) since the inorganic solid electrolyte does not include any organic substances as a principal ion-conductive material. In addition, the inorganic solid electrolyte is a solid in a static state and is thus, generally, not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, LiFSI, LiCl, and the like). The inorganic solid electrolyte is not particularly limited as long as the inorganic solid electrolyte has conductivity of ions of metals belonging to Group I or II of the periodic table and is generally a substance not having electron conductivity.

In the present invention, the inorganic solid electrolyte has ion conductivity of metals belonging to Group I or II of the periodic table. As the inorganic solid electrolyte, it is possible to appropriately select and use solid electrolyte materials that are applied to this kind of products. Typical examples of the inorganic solid electrolyte include (i) sulfide-based inorganic solid electrolytes and (ii) oxide-based inorganic solid electrolytes.

In the present invention, a sulfide-based inorganic solid electrolyte is preferably used from the viewpoint of enabling the formation of a more favorable interface between the active materials and the inorganic solid electrolyte in the electrode layers.

(i) Sulfide-based Inorganic Solid Electrolytes

Sulfide-based inorganic solid electrolytes are preferably inorganic solid electrolytes which contain sulfur atoms (S), have ion conductivity of metals belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases.

Examples thereof include lithium ion-conductive inorganic solid electrolytes satisfying a composition represented by Formula (1).

$$L_{a1}M_{b1}P_{c1}S_{d1}A_{e1} \quad (1)$$

(In the formula, L represents an element selected from Li, Na, and K and is preferably Li. M represents an element selected from B, Zn, Sn, Si, Cu, Ga, Sb, Al, and Ge. Among these, B, Sn, Si, Al, and Ge are preferred, and Sn, Al, and Ge are more preferred. A represents I, Br, Cl, and F and is preferably I or Br and particularly preferably I. a1 to e1 represent the compositional ratios among the respective elements, and a1:b1:c1:d1:e1 satisfies 1 to 12:0 to 1:1:2 to 12:0 to 5. Furthermore, a1 is preferably 1 to 9 and more preferably 1.5 to 4. b1 is preferably 0 to 0.5. Furthermore, d1 is preferably 3 to 7 and more preferably 3.25 to 4.5. Furthermore, e1 is preferably 0 to 3 and more preferably 0 to 1.)

In Formula (1), the compositional ratios among L, M, P, S, and A are preferably b1=0 and e1=0, more preferably b1=0, e1=0, and the ratio among a1, c1, and d1 (a1:c1:d1)=1 to 9:1:3 to 7, and still more preferably b1=0, e1=0, and a1:c1:d1=1.5 to 4:1:3.25 to 4.5. The compositional ratios among the respective elements can be controlled by adjusting the amounts of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of [1] lithium sulfide ($Li_2S$) and phosphorus sulfide (for example, diphosphorus pentasulfide ($P_2S_5$)), [2] lithium sulfide and at least one of a phosphorus single body and a sulfur single body, or [3] lithium sulfide, phosphorus sulfide (for example, diphosphorus pentasulfide ($P_2S_5$)), and at least one of a phosphorus single body and a sulfur single body.

The ratio between $Li_2S$ and $P_2S_5$ in Li—P—S-based glass and Li—P—S-based glass ceramic is preferably 65:35 to 85:15 and more preferably 68:32 to 77:23 in terms of the molar ratio between $Li_2S:P_2S_5$. In a case in which the ratio between $Li_2S$ and $P_2S_5$ is set in the above-described range, it is possible to increase the lithium ion conductivity. Specifically, the lithium ion conductivity can be preferably set to $1 \times 10^{-4}$ S/cm or more and more preferably set to $1 \times 10^{-3}$ S/cm or more. The upper limit is not particularly limited, but realistically $1 \times 10^{-1}$ S/cm or less.

Specific examples of the compound include compounds formed using a raw material composition containing, for example, $Li_2S$ and a sulfide of an element of Groups XIII to XV. Specific examples thereof include $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—

$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Among these, crystalline and/or amorphous raw material compositions consisting of $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—LiI—$Li_2O$—$P_2S_5$, $Li_2S$—$Li_2O$—$P_2S_5$, $Li_2S$—$Li_3PO_4$—$P_2S_5$, $Li_2S$—$GeS_2$—$P_2S_5$, and $Li_{10}GeP_2S_{12}$ are preferred due to their high lithium ion conductivity. Examples of a method for synthesizing sulfide-based inorganic solid electrolyte materials using the above-described raw material compositions include an amorphization method. Examples of the amorphization method include a mechanical milling method and a melting quenching method. Among these, the mechanical milling method is preferred. This is because treatments at normal temperature become possible, and it is possible to simplify manufacturing steps.

(ii) Oxide-based Inorganic Solid Electrolytes

Oxide-based inorganic solid electrolytes are preferably inorganic solid electrolytes which contain oxygen atoms (O), have an ion conductivity of metals belonging to Group I or II of the periodic table, and have electron-insulating properties.

Specific examples of the compounds include $Li_{xa}La_{ya}TiO_3$ [xa=0.3 to 0.7 and ya=0.3 to 0.7] (LLT), $Li_{xb}La_{yb}Zr_{zb}M^{bb}_{mb}O_{nb}$ ($M^{bb}$ is at least one element of Al, Mg, Ca, Sr, V, Nb, Ta, Ti, Ge, In and Sn, xb satisfies 5≤xb≤10, yb satisfies 1≤yb≤4, zb satisfies 1≤zb≤4, mb satisfies 0≤mb≤2, and nb satisfies 5≤nb≤20.), $Li_{xc}B_{yc}M^{cc}_{zc}O_n$, ($M^{cc}$ is at least one of C, S, Al, Si, Ga, Ge, In, and Sn, xc satisfies 0≤xc≤5, yc satisfies 0≤yc≤1, zc satisfies 0≤zc≤1, and nc satisfies 0≤nc≤6), $Li_{xd}(Al, Ga)_{yd}(Ti, Ge)_{zd}Si_{ad}P_{md}O_{nd}$ (1≤xd≤3, 0≤yd≤1, 0≤ad≤1, 1≤md≤7, 3≤nd≤13), $Li_{(3-2xe)}M^{ee}_{xe}D^{ee}O$ (xe represents a number of 0 or more and 0.1 or less, and $M^{ee}$ represents a divalent metal atom. $D^{ee}$ represents a halogen atom or a combination of two or more halogen atoms.), $Li_{xf}Si_{yf}O_{zf}$ (1≤xf≤5, 0≤yf≤3, 1≤zf≤10), $Li_{xg}S_{yg}O_{zg}$ (1≤xg≤3, 0<yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0≤yh≤1), $Li_7La_3Zr_2O_{12}$ having a garnet-type crystal structure. In addition, phosphorus compounds containing Li, P and O are also desirable. Examples thereof include lithium phosphate ($Li_3PO_4$), LiPON in which some of oxygen atoms in lithium phosphate are substituted with nitrogen, $LiPOD^1$ ($D^1$ is at least one selected from Ti, V, Cr, Mn, Fe, Co, Ni, Cu, Zr, Nb, Mo, Ru, Ag, Ta, W, Pt, Au, and the like), and the like. It is also possible to preferably use $LiA^1ON$ ($A^1$ represents at least one selected from Si, B, Ge, Al, C, Ga, and the like) and the like.

The volume-average particle diameter of the inorganic solid electrolyte is not particularly limited, but is preferably 0.01 μm or more and more preferably 0.1 μm or more. The upper limit is preferably 100 μm or less and more preferably 50 μm or less. Meanwhile, the average particle diameter of the inorganic solid electrolyte is measured in the following order. One percent by mass of a dispersion liquid is prepared using inorganic solid electrolyte particles and water (heptane in a case in which the inorganic solid electrolyte is unstable in water) in a 20 ml sample bottle by means of dilution. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby obtaining the volume-average particle diameter. Regarding other detailed conditions and the like, the description of JIS Z8828:2013 "Particle size analysis-Dynamic light scattering method" is referred to as necessary. Five specimens are produced per level, and the average values thereof are employed.

When a decrease in interface resistance and the maintenance of the decreased interface resistance are taken into account, the concentration of the inorganic solid electrolyte in the solid components of the material for a positive electrode is preferably 5% by mass or more, more preferably 10% by mass or more, and particularly preferably 20% by mass or more with respect to 100% by mass of the solid components. From the same viewpoint, the upper limit is preferably 99.9% by mass or less, more preferably 99.5% by mass or less, and particularly preferably 99% by mass or less.

Meanwhile, the solid components in the present specification refer to components that do not disappear through volatilization or evaporation when dried at 170° C. for six hours. Typically, the solid components refer to components other than a dispersion medium described below.

These inorganic solid electrolytes may be used singly or two or more inorganic solid electrolytes may be used in combination.

(Binder)

The material for a positive electrode of the present invention may also contain a binder.

The binder that is used in the present invention is not particularly limited as long as the binder is an organic polymer.

The binder that can be used in the present invention is preferably a binder that is generally used as binding agents for positive electrodes or negative electrodes of battery materials, is not particularly limited, and is preferably, for example, a binder consisting of resins described below.

Examples of fluorine-containing resins include polytetrafluoroethylene (PTFE), polyvinylene difluoride (PVdF), and copolymers of polyvinylene difluoride and hexafluoropropylene (PVdF-HFP).

Examples of hydrocarbon-based thermoplastic resins include polyethylene, polypropylene, styrene butadiene rubber (SBR), hydrogenated styrene butadiene rubber (HSBR), butylene rubber, acrylonitrile butadiene rubber, polybutadiene, and polyisoprene.

Examples of acrylic resins include polymethyl (meth)acrylate, polyethyl (meth)acrylate, polyisopropyl (meth)acrylate, polyisobutyl (meth)acrylate, polybutyl (meth)acrylate, polyhexyl (meth)acrylate, polyoctyl (meth)acrylate, polydodecyl (meth)acrylate, polystearyl (meth)acrylate, poly 2-hydroxyethyl (meth)acrylate, poly(meth)acrylate, polybenzyl (meth)acrylate, polyglycidyl (meth)acrylate, polydimethylaminopropyl (meth)acrylate, and copolymers of monomers constituting the above-described resins.

In addition, copolymers with other vinyl-based monomers are also preferably used. Examples thereof include polymethyl (meth)acrylate-polystyrene copolymers, polymethyl (meth)acrylate-acrylonitrile copolymers, and polybutyl (meth)acrylate-acrylonitrile-styrene copolymers.

These binders may be used singly or two or more binders may be used in combination.

The moisture concentration of a polymer constituting the binder that is used in the present invention is preferably 100 ppm (mass-based).

In addition, the polymer constituting the binder that is used in the present invention may be dried by being crystallized or may be used in a polymer solution form. The amount of a metal-based catalyst (an urethanization or polyesterification catalyst: tin, titanium, or bismuth) is preferably small. The concentration of metal in copolymers is preferably set to 100 ppm or less (mass-based) by decreasing the amount of the metal during polymerization or removing the catalyst by means of crystallization.

The solvent that is used for the polymerization reaction of the polymer is not particularly limited. Meanwhile, solvents that do not react with the inorganic solid electrolyte or the active materials and furthermore do not decompose the inorganic solid electrolyte or the active materials are desirably used. For example, it is possible to use hydrocarbon-based solvents (toluene, heptane, and xylene), ester-based solvents (ethyl acetate and propylene glycol monomethyl ether acetate), ether-based solvents (tetrahydrofuran, dioxane, and 1,2-diethoxyethane), ketone-based solvents (acetone, methyl ethyl ketone, and cyclohexanone), nitrile-based solvents (acetonitrile, propionitrile, butyronitrile, and isobutyronitrile), and halogen-based solvents (dichloromethane and chloroform).

The mass average molecular weight of the polymer constituting the binder that is used in the present invention is preferably 10,000 or more, more preferably 20,000 or more, and still more preferably 50,000 or more. The upper limit is preferably 1,000,000 or less, more preferably 200,000 or less, and still more preferably 100,000 or less.

In the present invention, the molecular weight of the polymer refers to the mass average molecular weight unless particularly otherwise described. The mass average molecular weight can be measured as the polystyrene-equivalent molecular weight by means of GPC. At this time, the polystyrene-equivalent molecular weight is detected as RI using a GPC apparatus HLC-8220 (manufactured by Tosoh Corporation) and G3000HXL+G2000HXL as columns at a flow rate at 23° C. of 1 mL/min. An eluent can be selected from tetrahydrofuran (THF), chloroform, N-methyl-2-pyrrolidone (NMP), and m-cresol/chloroform (manufactured by Shonanwako Junyaku KK), and THF is used in a case in which the polymer needs to be dissolved.

In a case in which favorable interface resistance-reducing and maintaining properties are taken into account when the binder is used in the all-solid state secondary battery, the concentration of the binder in the material for a positive electrode is preferably 0.01% by mass or more, more preferably 0.1% by mass or more, and still more preferably 1% by mass or more with respect to 100% by mass of the solid components. From the viewpoint of battery characteristics, the upper limit is preferably 10% by mass or less, more preferably 5% by mass or less, and still more preferably 3% by mass or less.

In the present invention, the mass ratio [(the mass of the inorganic solid electrolyte and the mass of the positive electrode active material)/the mass of the binder] of the total mass of the inorganic solid electrolyte and the positive electrode active material to the mass of the binder is preferably in a range of 1,000 to 1. This ratio is more preferably 500 to 2 and still more preferably 100 to 10.

(Auxiliary Conductive Agent)

The material for a positive electrode of the present invention includes an auxiliary conductive agent. The auxiliary conductive agent that is used in the present invention is not particularly limited. The form thereof is also not particularly limited, and examples thereof include carbon black, graphite, carbon fibers, carbon nanotubes, and the like. The specific surface area of the auxiliary conductive agent is preferably 50 $m^2/g$ or less, more preferably 30 $m^2/g$ or less, and still more preferably 10 $m^2/g$ or less. The lower limit is not particularly limited, but is realistically 0.01 $m^2/g$ or more. In a case in which the specific surface area of the auxiliary conductive agent is set in the above-described range, although the reason is not clear, the auxiliary conductive agent can be smoothly mixed with other solid components such as active materials, and it is possible to improve electron conductivity in the positive electrode active material layer that is produced using the material for a positive electrode of the present invention.

The auxiliary conductive agent that is used in the present invention is preferably made of a carbon material, and the length Lc of a crystallite calculated from a (002) diffraction line, which is measured using a wide-angle X-ray diffraction method, is preferably 100 angstroms or more, more preferably 300 angstroms or more, and particularly preferably 500 angstroms or more. The upper limit is not particularly limited, but is realistically 2,000 angstroms or less. Although the reason is not clear, in a case in which the Lc of the auxiliary conductive agent is in the above-described range, crystallinity is high, and it is possible to improve electron conductivity in the positive electrode active material layer.

Here, the "carbon material" refers to a material having carbon atoms as the principal component. Carbon atoms being as the principal component means that the proportion of the carbon atoms in all constituent atoms is 50% by weight or more.

The content of the auxiliary conductive agent in the material for a positive electrode of the present invention is not particularly limited, but is preferably 0.01% to 10% by mass, more preferably 0.05% to 8% by mass, and still more preferably 0.1% to 7% by mass with respect to 100% by mass of the solid components of the material for a positive electrode. This is because, in the above-described range, electron conductivity in the positive electrode active material layer that is produced using the material for a positive electrode of the present invention is favorable, and it is possible to ensure the compositional ratio of the positive electrode active material to the positive electrode active material layer at a high level.

In the present invention, the average particle diameter of the auxiliary conductive agent is preferably 0.1 to 50 µm, more preferably 0.5 to 40 µm, and particularly preferably 1 to 30 µm. This is because, in the above-described range, the dispersion of the auxiliary conductive agent in the material for a positive electrode is easy, and thus it is possible to improve electron conductivity in the positive electrode active material layer that is produced using the material for a positive electrode of the present invention. The average particle diameter of the auxiliary conductive agent can be measured using the same method as a measurement method described in the section of examples below.

As the auxiliary conductive agent that is used in the present invention, commercially available products can be used. Specific examples thereof include acetylene black manufactured by Denka Company Limited, VGCF (trade name, vapor-grown carbon fiber) manufactured by Showa Denko K.K., CGB20 (trade name, natural graphite having an average particle diameter of 20 µm) manufactured by Nippon Kokuen Group, CDK01 (trade name, natural graphite having an average particle diameter of 30 µm), CDK02

(trade name, natural graphite having an average particle diameter of 20 μm) manufactured by Chuo Denki Kogyo Co., Ltd.

(Positive Electrode Active Material)

Next, the positive electrode active material that is used in the material for a positive electrode of the present invention will be described. The positive electrode active material is preferably a positive electrode active material capable of reversibly intercalating and deintercalating lithium ions. The above-described material is not particularly limited and may be transition metal oxides, elements capable of being complexed with Li such as sulfur, or the like. Among these, transition metal oxides are preferably used, and the transition metal oxides more preferably have one or more elements selected from Co, Ni, Fe, Mn, Cu, and V as transition metal. Specific examples of the transition metal oxides include transition metal compounds having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobaltate [LCO]), $LiNi_2O_2$ (lithium nickelate), $LiNi_{0.80}Co_{0.15}Al_{0.05}O_2$ (lithium nickel cobalt aluminum oxide [NCA]), $LiNi_{0.33}Co_{0.33}Mn_{0.33}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiCoMnO_4$, $Li_2Fe-Mn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

The volume-average particle diameter (circle-equivalent average particle diameter) of the positive electrode active material that is used as the material for a positive electrode in the present invention is not particularly limited. Meanwhile, the volume-average particle diameter is preferably 0.1 μm to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The average particle diameter of positive electrode active material particles was measured using a laser diffraction/scattering-type particle size distribution measurement instrument LA-920 (trade name, manufactured by Horiba Ltd.).

The concentration of the positive electrode active material is not particularly limited, but is preferably 10% to 90% by mass and more preferably 20% to 80% by mass with respect to 100% by mass of the solid components in the material for a positive electrode.

The mass (mg) (basis weight) of the positive electrode active material per unit area ($cm^2$) of the positive electrode active material layer is not particularly limited. The mass can be arbitrarily determined depending on the designed battery capacity.

The positive electrode active material may be used singly or two or more positive electrode active materials may be used in combination.

(Dispersant)

Next, a dispersant that is used in the present invention will be described.

The dispersant that is used in the present invention includes a compound having at least one selected from a group of functional groups (I). The dispersant that is used in the present invention is preferably a compound having at least one selected from a group of functional groups (I). Hereinafter, description will be made using a case in which the dispersant that is used in the present invention is a compound having at least one selected from a group of functional groups (I) as an example.

Group of functional groups (I): acidic groups, (meth) acryloyl groups, (meth)acryloyloxy groups, (meth)acrylamide groups, alkoxysilyl groups, epoxy groups, oxetanyl groups, isocyanate groups, cyano groups, and mercapto groups The functional group equivalent (the molecular weight of the compound having at least one selected from the group of functional groups (I) per functional group selected from the group of functional groups (I)) is not particularly limited, but is preferably 30 to 3,000, more preferably 50 to 2,000, and particularly preferably 50 to 1,000.

In a case in which the material for a positive electrode of the present invention contains the dispersant, it is possible to realize favorable discharge capacity and output characteristics. This is because, in a case in which the dispersant has at least one selected from the group of functional groups (I), the dispersant interacts with the positive electrode active material and improves the dispersibility of the auxiliary conductive agent, and it is possible to improve the affinity between the positive electrode active material and the auxiliary conductive agent, and thus it is possible to uniform the mixing state of the material for a positive electrode and uniform the distances between solid particles in the positive electrode active material layer.

Here, in the present invention, in a case in which the fundamental skeleton of the dispersant is a ring structure, the scope of the epoxy group and the oxetanyl group include epoxy rings and oxetane rings that are condensed into the ring.

Among the group of functional groups (I), acidic groups, alkoxysilyl groups, epoxy groups, oxetanyl groups, isocyanate groups, and mercapto groups are more preferred, acidic groups, alkoxysilyl groups, epoxy groups, isocyanate groups, and mercapto groups are still more preferred, and acidic groups, epoxy groups, and mercapto groups are particularly preferred.

Examples of the acidic groups include a carboxy group, a sulfo group, a phosphoric acid group, a phosphonic acid group, a phosphinic acid group, a boric acid group, and salts thereof. Among these, a carboxy group and salts thereof, a sulfo group and salts thereof, a boric acid group or salts thereof are preferred, and a carboxy group and salts thereof are particularly preferred.

Meanwhile, the salts are preferably lithium salts, potassium salts, and sodium salts.

The dispersant that is used in the present invention may have any structure as long as the dispersant has at least one selected from the group of functional groups (I), and, in the present invention, the dispersant may be a polymer including an oligomer.

Meanwhile, in the case of polymers, polymers having a repeating unit of a monomer selected from aromatic hydrocarbons having a vinyl group as a substituent such as (meth)acrylic acids, (meth)acrylic acid esters, and styrene are preferred, (meth)acrylic polymers or (meth)acrylic copolymers are preferred. Among (meth)acrylic polymers, (meth)acrylic acids or copolymers of a (meth)acrylic acid ester and an aromatic hydrocarbon having a vinyl group as a substituent are preferred.

The dispersant that is used in the present invention is more preferably a polymer than a monomer.

The dispersant that is used in the present invention is preferably a compound represented by General Formula (D) or a compound including a structure in which at least one hydrogen atom in the compound is substituted with a bond. In addition, the mass average molecular weight of the compound including a structure in which at least one hydrogen atom in the compound represented by General Formula (D) is substituted with a bond is preferably 50 to 30,000, more preferably 100 to 15,000, and particularly preferably 150 to 10,000. The mass average molecular weight can be measured in the same manner as in the above-described measurement method.

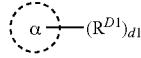

General Formula (D)

In General Formula (D), ring α represents a monocyclic or polycyclic ring, $R^{D1}$ represents a substituent bonded to a constituent atom of the ring α, and d1 represents an integer of 1 or more. In a case in which d1 is 2 or more, a plurality of $R^{D1}$'s may be identical to or different from each other. In addition, two $R^{D1}$'s substituting the same atom may be bonded to each other and thus form =O or an alkylidene group, and $R^{D1}$'s substituting atoms adjacent to each other may be bonded to each other and thus form a ring. However, in a case in which an epoxy ring or an oxetane ring is not condensed into the ring α, at least one $R^{D1}$ is a functional group selected from the group of functional groups (I) or a group including the functional group.

The compound including a structure in which at least one hydrogen atom in the compound represented by General Formula (D) is substituted with a bond "—" may be any compound as long as the compound has a structure in which at least one hydrogen atom in the compound represented by General Formula (D) is substituted with a bond "—". For example, in a case in which a substituent in the ring α is —OH, compounds including a structure in which the hydrogen atom from the ring α—OH is substituted with a bond "—", that is, a partial structure of the ring α—O— can be considered as the above-described compound.

The compound including the structure in which at least one hydrogen atom in the compound represented by General Formula (D) is substituted with a bond "—" may be a derivative (monomer) of the compound represented by General Formula (D) or a polymer including an oligomer.

Hereinafter, the compound including the structure in which at least one hydrogen atom in the compound represented by General Formula (D) is substituted with a bond "—" will be referred to as the compound including a partial structure represented by General Formula (D).

In the case of the derivative, to the bond that has substituted a hydrogen atom, a group other than hydrogen atoms, that is, a substituent is bonded.

Here, the derivative (monomer) refers to a compound derived by the esterification, etherification, or the like of a hydroxy group and the esterification, amidation, or the like of a carboxy group occurring in a hydroxy group and an alkyl group substituted with a reactive group such as a hydroxy group or a carboxy group among substituents as $R^{D1}$.

In the present invention, the compound including the partial structure represented by General Formula (D) is preferably a polymer including an oligomer.

The partial structure represented by General Formula (D) may be included in any of the main chain or a side chain of the polymer and a polymer terminal.

In the partial structure represented by General Formula (D), to the front of the bond "—", for example, the polymer including an oligomer may be bonded as a residue.

Meanwhile, the partial structure being included in the main chain of the polymer means that a structure in which at least two hydrogen atoms in the compound represented by General Formula (D) are substituted with bonds is combined into the polymer and serves as a chain that becomes the repeating structure of the polymer. On the other hand, the partial structure being included in a side chain of the polymer means that a structure in which one hydrogen atom in the compound represented by General Formula (D) is substituted with a bond is combined into the polymer and is bonded to the main chain of the polymer through only one bond, and the partial structure being included in a polymer terminal means that a structure in which one hydrogen atom in the compound represented by General Formula (D) is substituted with a bond is combined into the polymer and is present in a terminal of a polymer chain. Here, the partial structure may be included in a plurality of the main chains or side chains of the polymer or a plurality of polymer terminals.

In the present invention, the main chain or a side chain is preferred, and a side chain is more preferred.

Examples of the ring α include saturated, unsaturated, or aromatic hydrocarbon rings, saturated, unsaturated, or aromatic hetero rings, and rings including these rings.

The ring α is preferably a saturated, unsaturated, or aromatic hydrocarbon ring or a hydrocarbon ring obtained by condensing an epoxy ring or an oxetane ring into the above-described ring.

In addition, examples of rings constituting the ring α include monocycles, condensed polycycles, crosslinked rings, and spirocycles. Individual rings constituting the above-described rings are preferably three to seven-membered rings, more preferably five or six-membered rings, and still more preferably six-membered rings.

Typical examples of the ring α will be illustrated below, but the present invention is not limited thereto.

Here, some of carbon atoms may be substituted with hetero atoms such as an oxygen atom, a sulfur atom, and a nitrogen atom.

In addition, in a case in which the partial structure has a saturated or unsaturated hydrocarbon ring other than a benzene ring, only saturated hydrocarbon rings will be illustrated, but the scope of the hydrocarbon ring include hydrocarbon rings in which a single bond is substituted with a double bond and hydrocarbon rings into which an epoxy ring or an oxetane ring is condensed.
Ring α
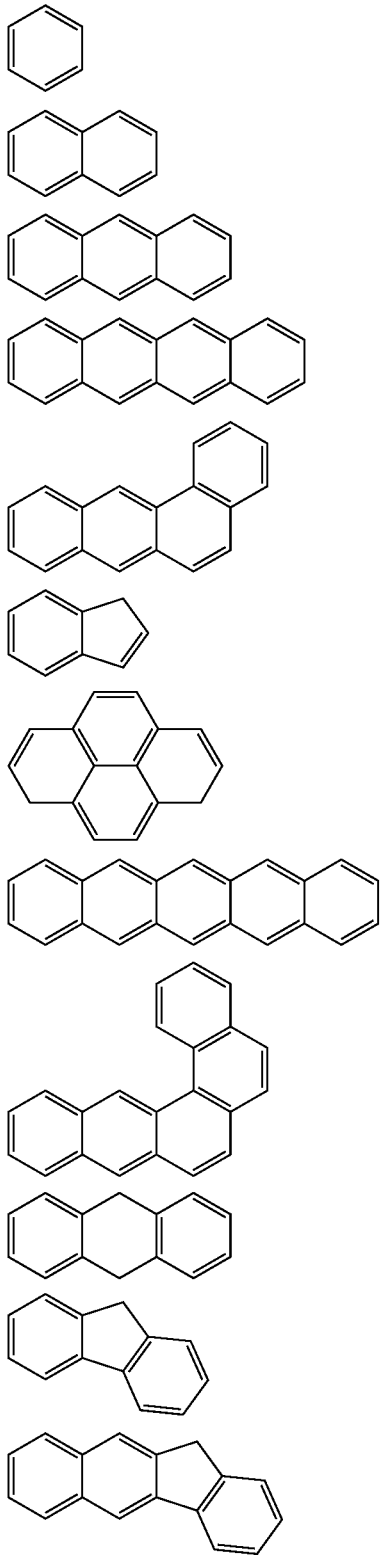
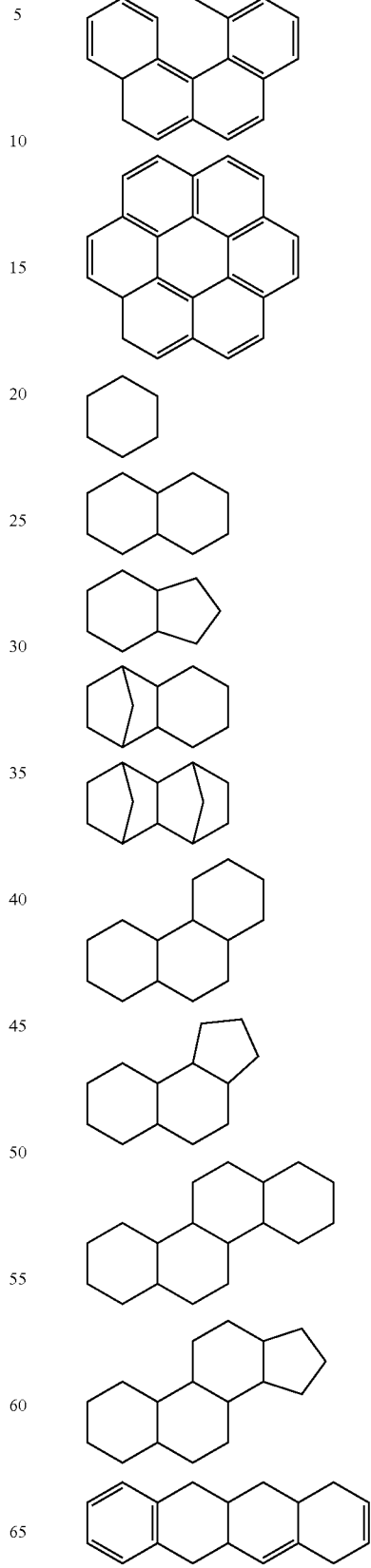

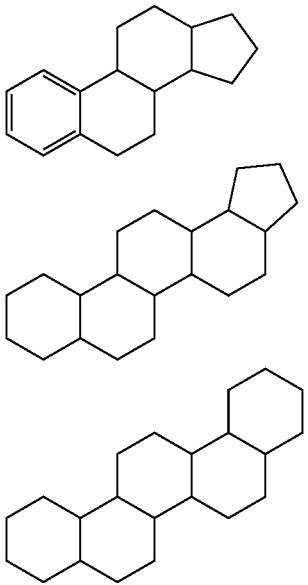

In the present invention, the ring α is, particularly, preferably a condensed structure made up of two or more rings, more preferably a condensed structure made up of three or more rings, and particularly preferably a condensed polycyclic hydrocarbon ring of three or more rings into which an epoxy ring or an oxetane ring may be condensed.

This is considered to be because, in a case in which the ring α is a condensed structure made up of three or more rings, the ring α interacts with the auxiliary conductive agent more often, the dispersion stability of the material for a positive electrode further improves, and it is possible to uniform the distances among solid particles in the positive electrode active material layer.

$R^{D1}$ represents a substituent bonded to an element on the ring α. In a case in which an epoxy ring or an oxetane ring is not condensed into the ring α, at least one $R^{D1}$ is a functional group selected from the group of functional groups (I) or a group including the functional group.

Here, the group including the functional group selected from the group of functional groups (I) is a group in which the functional group selected from the group of functional groups (I) substitutes the ring α through a linking group. In addition, the group including the functional group selected from the group of functional groups (I) may include two or more functional groups selected from the group of functional groups (I).

The linking group is preferably a divalent linking group or a trivalent linking group and more preferably a divalent linking group.

Meanwhile, examples of the trivalent linking group include *=C($R^{R1}$)—. Here, $R^{R1}$ represents a hydrogen atom or a substituent (preferably an alkyl group). In addition, * represents a bond that is bonded to the ring α.

The group including the functional group selected from the group of functional groups (I) is preferably a group represented by General Formula (L).

$$-L_1-R^{L1} \qquad \text{General Formula (L)}$$

In General Formula (L), $R^{L1}$ represents the functional group selected from the group of functional groups (I), and $L^1$ represents a single bond or a divalent linking group.

Examples of the divalent linking group as $L^1$ include —O—, —S—, —N($R^{R2}$)—, —C(=O)—, —SO$_2$—, —SO—, alkylene groups (preferably having 1 to 30 carbon atoms, more preferably having 1 to 20 carbon atoms, and particularly preferably having 1 to 10 carbon atoms, and examples thereof include methylene, ethylene, methylethylene (propylene), 1,2-dimethylethylene, 1,1- or 2,2-dimethylethylene, tetramethylene, octamethylene, decamethylene, hexadecamethylene, cyclopropylene, cyclopentylene, cyclohexylene, and the like), alkenylene groups (preferably having 2 to 30 carbon atoms, more preferably having 2 to 20 carbon atoms, and particularly preferably having 2 to 10 carbon atoms, and examples thereof include vinylene, 2-butenylene, 3-pentenylene, and the like), alkynylene groups (preferably having 2 to 30 carbon atoms, more preferably having 2 to 20 carbon atoms, and particularly preferably having 2 to 10 carbon atoms, and examples thereof include ethynylene, propargylene, 3-pentenylene, and the like), arylene groups (preferably having 6 to 30 carbon atoms, more preferably having 6 to 20 carbon atoms, and particularly preferably having 6 to 12 carbon atoms, and examples thereof include phenylene, p-methylphenylene, naphthylene, anthranylene, and the like), and groups obtained by combining the above-described groups. Meanwhile, $R^{R2}$ represents a hydrogen atom, an alkyl group, an aryl group, or an acyl group.

Here, examples of the groups obtained by combining the respective groups described above include *—O—C(=O)—, *—C(=O)—O—, *—N($R^R$)—C(=O)—, *—C(=O)—N($R^{R2}$)—, *SO$_2$—N($R^{R2}$)—, *—N($R^{R2}$)—SO$_2$—, *—O-(alkylene-O)nα-, *-(alkylene-O)nα-, *-alkylene-O—C(=O)-alkylene-, *—C(=O)-alkylene-O—, *—N($R^{R2}$)—C(=O)-alkylene-, *—C(=O)—O-alkylene-, *—O— alkylene-, *-alkylene-C(=O)—N($R^{R2}$)-alkylene, and *-alkylene-C(=O)—N($R^{R2}$)-alkylene-N($R^{R2}$)-alkylene-.

Here, nα represents an integer of 1 or more (preferably an integer of 1 to 30). In addition, * represents a bond that is bonded to the ring α.

Meanwhile, the alkylene (alkylene group) in *—O-(alkylene-O)nα- or *-(alkylene-O)nα-is preferably ethylene or propylene, and the total number of carbon atoms in the group is preferably 1 to 30, more preferably 1 to 20, and particularly preferably 1 to 10.

Examples of substituents as $R^{D1}$ other than the functional group selected from the group of functional groups (I) or the group including the functional group include alkyl groups (preferably having 1 to 30 carbon atoms, more preferably having 1 to 20 carbon atoms, and particularly preferably having 1 to 10 carbon atoms, and examples thereof include methyl, ethyl, i-propyl, t-butyl, n-octyl, n-decyl, n-hexadecyl, cyclopropyl, cyclopentyl, cyclohexyl, and the like), alkenyl groups (preferably having 2 to 30 carbon atoms, more preferably having 2 to 20 carbon atoms, and particularly preferably having 2 to 10 carbon atoms, and examples thereof include vinyl, allyl, 2-butenyl, 3-pentenyl, and the like), alkynyl groups (preferably having 2 to 30 carbon atoms, more preferably having 2 to 20 carbon atoms, and particularly preferably having 2 to 10 carbon atoms, and examples thereof include propargyl, 3-pentynyl, and the like), aryl groups (preferably having 6 to 30 carbon atoms, more preferably having 6 to 20 carbon atoms, and particularly preferably having 6 to 12 carbon atoms, and examples thereof include phenyl, p-methylphenyl, naphthyl, anthranyl, and the like), amino groups (including an alkylamino group, an arylamino group, or, a heterocyclic amino group, preferably having 0 to 30 carbon atoms, more preferably having 0 to 20 carbon atoms, and particularly preferably having 0 to 10 carbon atoms, and examples thereof include amino, methylamino, dimethylamino, diethylamino, dibenzylamino, diphenylamino, ditolylamino, and the like), alkoxy groups (preferably having 1 to 30 carbon atoms, more preferably having 1 to 20 carbon atoms, and particularly preferably having 1 to 10 carbon atoms, and examples thereof include methoxy, ethoxy, butoxy, 2-ethylhexyloxy, and the like), hydroxy groups, formyl groups, acyl groups (preferably having 2 to 30 carbon atoms, more preferably having 2 to 20 carbon atoms, and particularly preferably having 2 to 10 carbon atoms, and examples thereof include acetyl, benzoyl, naphthoyl, and the like), formyloxy groups, acyloxy groups (preferably having 2 to 30 carbon atoms, more preferably having 2 to 20 carbon atoms, and particularly preferably having 2 to 10 carbon atoms, and examples thereof include acetyloxy, benzoyloxy, naphthoyloxy, and the like), halogen atoms, and the like.

d1 represents an integer of 1 or more and is preferably 1 to 10.

In a case in which d1 is 2 or more, a plurality of $R^{D1}$'s may be identical to or different from each other.

In this case, two $R^{D1}$'s substituting the same atom may be bonded to each other and thus form =O or an alkylidene group. Here, the alkylidene group is preferably =C($R^{D3}$)($R^{D4}$). Meanwhile, $R^{D3}$ and $R^{D4}$ each independently represent a hydrogen atom or a substituent (preferably the alkyl group, the alkenyl group, or the aryl group described above).

In addition, $R^{D1}$'s substituting atoms adjacent to each other may be bonded to each other and thus form a ring.

Examples of the above-described ring include monocyclic rings or condensed rings of five or six-membered rings, and the above-described ring may be any one of a saturated ring, an unsaturated ring, or an aromatic ring. In addition, the ring may be any one of a hydrocarbon ring or a hetero ring; however, in the present invention, is preferably a hydrocarbon ring.

The compound represented by General Formula (D) is preferably a compound represented by General Formula (DA) or (DB).

General Formula (DA)

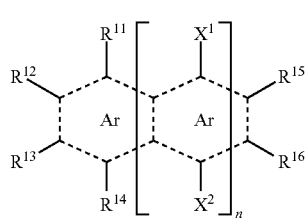

In General Formula (DA), Ar represents a benzene ring. n represents an integer of 0 to 8. n is preferably an integer of 0 to 6 and more preferably an integer of 0 to 3. $R^{11}$ to $R^{16}$ each independently represent a hydrogen atom or a substituent. $X^1$ and $X^2$ each independently represent a hydrogen atom or a substituent. Here, in $R^{11}$ to $R^{16}$ and $X^1$ and $X^2$, groups adjacent to each other may be bonded to each other and thus form a five or six-membered ring. Here, in a case in which n is one for at least one of $R^{11}$ to $R^{16}$ and $X^1$ and $X^2$, in $R^{11}$ to $R^{16}$ and $X^1$ and $X^2$, at least two atoms or substituents adjacent to each other are bonded to each other and thus form a benzene ring. In addition, any one substituent of $R^{11}$ to $R^{16}$ and $X^1$ and $X^2$ is a functional group selected from the group of functional groups (I) or a group including the functional group.

General Formula (DB)

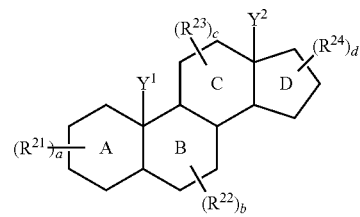

In General Formula (DB), $Y^1$ and $Y^2$ each independently represent a hydrogen atom, a methyl group, or a formyl group. $R^{21}$, $R^{22}$, $R^{23}$, and $R^{24}$ each independently represent a substituent, and a, b, c, and d each independently represent an integer of 0 to 4.

Here, A ring may be a saturated ring, an unsaturated ring or aromatic ring having one or two double bonds, and B ring and C ring may be an unsaturated ring having one or two double bonds. Meanwhile, into any one of the A ring to the D ring, an epoxy ring or an oxetane ring may be condensed.

Meanwhile, in a case in which a, b, c, and d each are an integer of 2 to 4, substituents adjacent to each other may be bonded to each other and thus form a ring, and substituents bonded to the same carbon atom may form =O or an ethylidene group.

Here, in a case in which an epoxy ring or an oxetane ring is not condensed into any one of the A ring to the D ring, at least any one of a, b, c, and d is one, and at least any one substituent of $R^{21}$, $R^{22}$, $R^{23}$, and $R^{24}$ is a functional group selected from the group of functional groups (I) or a group including the functional group.

Hereinafter, specific examples of the dispersant that is used in the present invention will be illustrated, but dispersants that can be employed in the present invention are not limited to these specific examples. Meanwhile, a and b represent mole compositional ratios in copolymers, and a and b are arbitrary values of 0 or 1, but the sum of a and b is one.

D-1

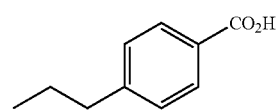

D-2

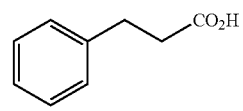

D-3

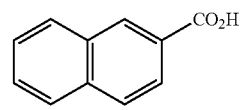

D-4

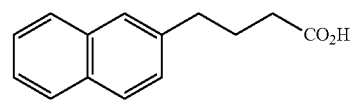

-continued
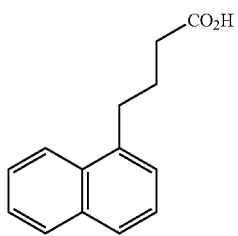
D-5
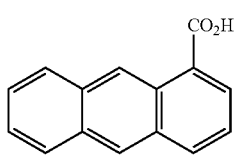
D-6
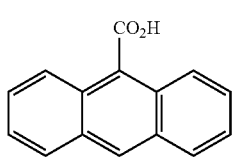
D-7
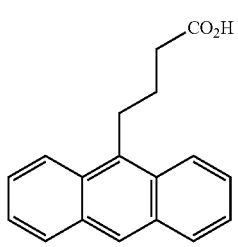
D-8
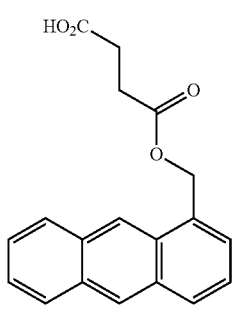
D-9
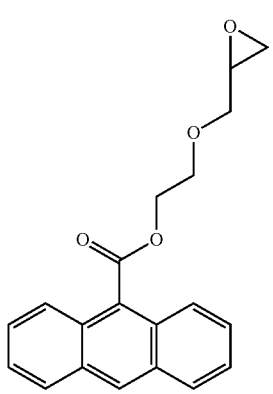
D-10
-continued
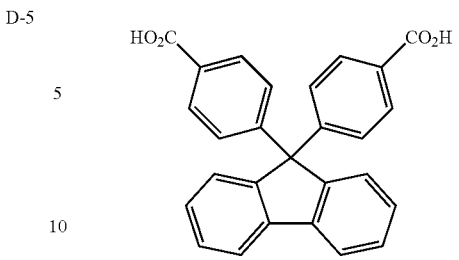
D-11
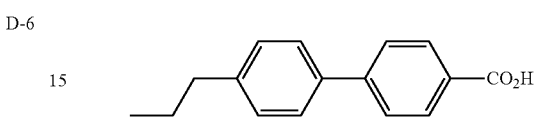
D-12
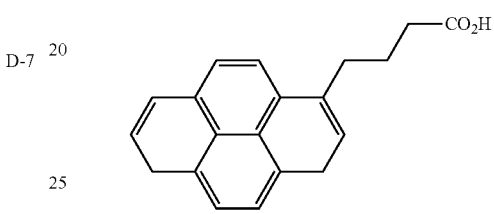
D-13
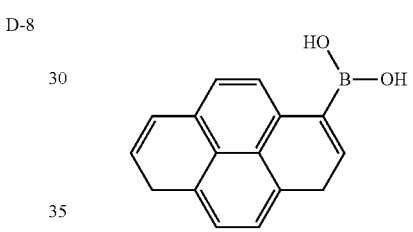
D-14
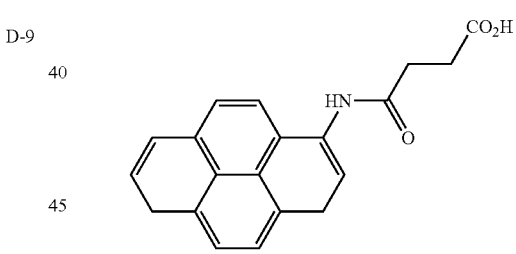
D-15
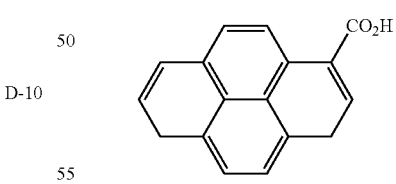
D-16
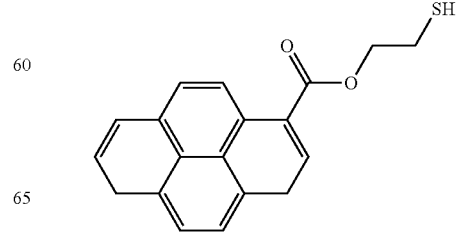
D-17

-continued

D-32
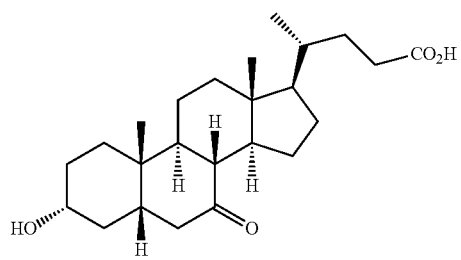
D-33
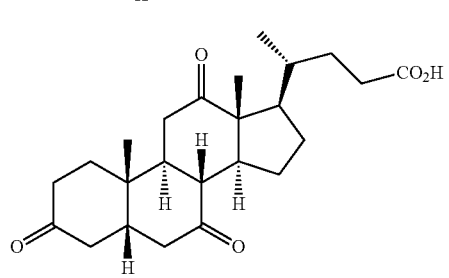
D-34
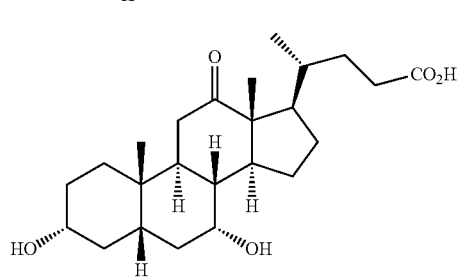
D-35
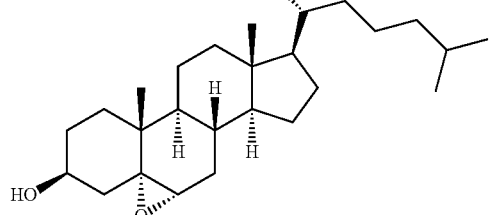
D-36
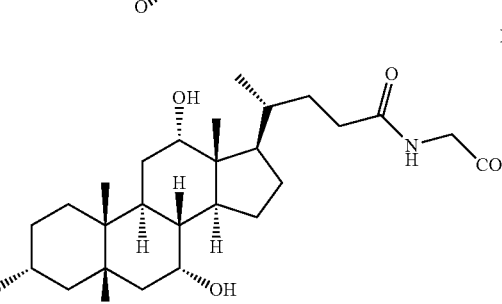
D-37
D-38
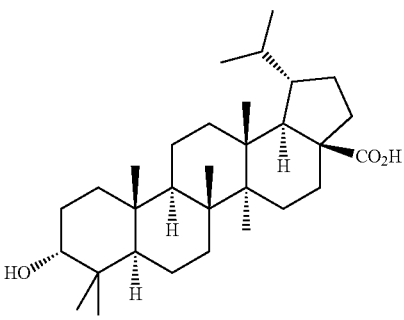
D-39
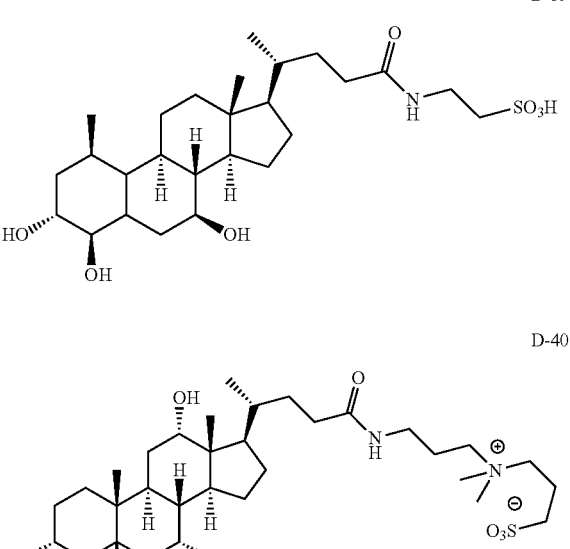
D-40
D-41
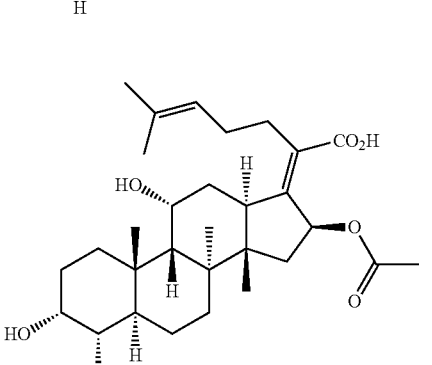
D-42
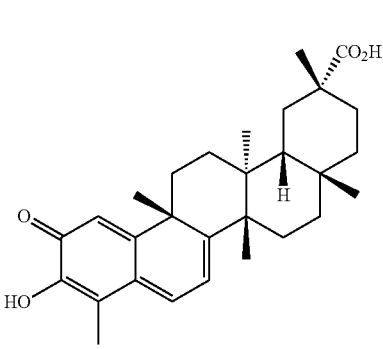

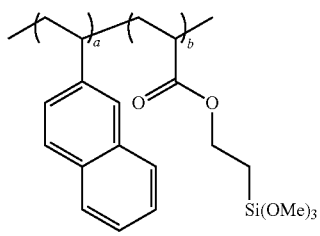
D-43

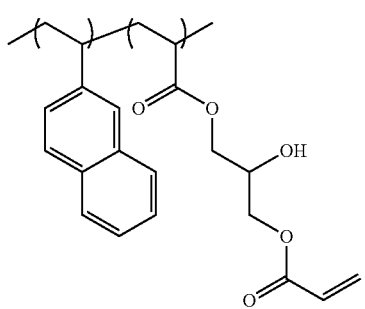
D-44

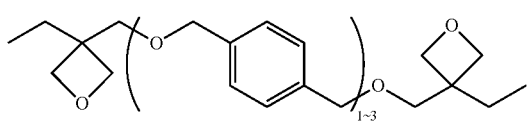
D-45

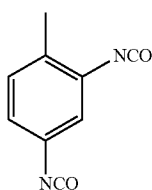
D-46

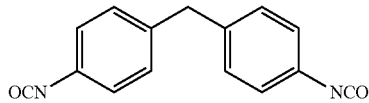
D-47

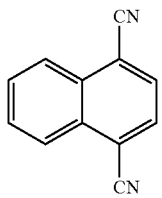
D-48

As the compound represented by General Formula (D), commercially available products can be used. In the case of polymers, the compound can be obtained using an ordinary method such as the radical polymerization of corresponding monomers.

In addition, the compound represented by General Formula (D) or the compound including the structure in which at least one hydrogen atom in the compound is substituted with a bond can be synthesized using an ordinary method. For example, the compound can be synthesized by electrophilic substitution such as an esterification reaction, an etherification reaction, an amidation reaction, a coupling reaction, the Friedel-Crafts reaction, or the Vilsmeier-Haack reaction.

The content of the dispersant that is used in the present invention is not particularly limited, but is preferably 0.00001% to 10% by mass, more preferably 0.001% to 5% by mass or more, and still more preferably 0.01% to 3% by mass or more with respect to 100% by mass of the solid components of the material for a positive electrode. In addition, in the material for a positive electrode, the content of the dispersant with respect to the auxiliary conductive agent (with respect to 100% by mass of the auxiliary conductive agent) is preferably 0.01% to 10% by mass.

(Dispersion Medium)

The material for a positive electrode of the present invention may also contain a dispersion medium that disperses the respective components described above. Specific examples of the dispersion medium include the following media.

Examples of alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, and the like), dimethyl ether, diethyl ether, diisopropyl ether, dibutyl ether, tetrahydrofuran, and dioxane.

Examples of amide compound solvents include N,N-dimethylformamide, 1-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, hexamethylphosphoric triamide, and the like.

Examples of amino compound solvents include triethylamine, diisopropylethylamine, and tributylamine.

Examples of ketone compound solvents include acetone, methyl ethyl ketone, methyl isobutyl ketone, and cyclohexanone.

Examples of aromatic compound solvents include benzene, toluene, xylene, and the like.

Examples of aliphatic compound solvents include hexane, heptane, octane, decane, and the like.

Examples of nitrile compound solvents include acetonitrile, propionitrile, isobutyronitrile, and the like.

Examples of non-aqueous dispersion media include the aromatic compound solvents, the aliphatic compound solvents, and the like.

The boiling point of the dispersion medium at normal pressure (one atmosphere) is preferably 50° C. or higher and more preferably 70° C. or higher. The upper limit is preferably 250° C. or lower and more preferably 220° C. or lower. The dispersion media may be used singly or two or more dispersion media may be used in combination.

In the present invention, among these, the nitrile compound solvents and the aliphatic compound solvents are preferred, and isobutyronitrile and heptane are more preferred.

The content of the dispersion medium with respect to 100 parts by mass of the total mass of the material for a positive electrode is preferably 10 to 10,000 parts by mass, more preferably 30 to 5,000 parts by mass, and still more preferably 50 to 1,000 parts by mass.

«Solid Electrolyte Composition»

Hereinafter, a solid electrolyte composition that is preferably used as a material used to form the solid electrolyte layer and the negative electrode active material layer constituting the all-solid state secondary battery of the present invention will be described.

The solid electrolyte composition preferably contains the inorganic solid electrolyte, the binder, and the dispersion medium. The solid electrolyte composition may contain a dispersant, the auxiliary conductive agent, and the lithium salt as necessary.

Meanwhile, in the case of being used as the material for a negative electrode for forming the negative electrode active material layer, the solid electrolyte composition contains a negative electrode active material described below.

(Negative Electrode Active Material)

The negative electrode active material is preferably a negative electrode active material capable of reversibly intercalating and deintercalating lithium ions. The above-described material is not particularly limited and may be a carbonaceous material, a metal oxide such as tin oxide or silicon oxide, a metal complex oxide, a lithium single body, a lithium alloy such as a lithium aluminum alloy, metal capable of forming alloys with lithium such as Sn, Si, or In. Among these, carbonaceous materials or metal complex oxides are preferably used from the viewpoint of reliability. In addition, the metal complex oxides are preferably capable of absorbing and discharging lithium. The material is not particularly limited, but preferably contains titanium and/or lithium as constituent elements from the viewpoint of high-current density charging and discharging characteristics.

The carbonaceous material that is used as the negative electrode active material refers to a material substantially made of carbon. Examples thereof include natural graphite such as petroleum pitch, artificial graphite such as vapor-grown graphite, and carbonaceous materials obtained by firing a variety of synthetic resins such as PAN-based resins or furfuryl alcohol resins. Additionally, examples thereof include a variety of carbon fibers such as PAN-based carbon fibers, cellulose-based carbon fibers, pitch-based carbon fibers, vapor-grown carbon fibers, dehydrated PVA-based carbon fibers, lignin carbon fibers, glassy carbon fibers, and active carbon fibers, mesophase microscopic spheres, graphite whisker, plate-shaped graphite, and the like.

The metal oxides and the metal complex oxides that are applied as the negative electrode active material are particularly preferably amorphous oxides, and furthermore, chalcogenide which is a reaction product between a metal element and an element belonging Group XVI of the periodic table is also preferably used. The amorphous oxides mentioned herein refer to oxides having a broad diffusion band in which the peak is present in a 2θ value range of 20° to 40° in an X-ray diffraction method in which CuKα rays are used and may have crystalline diffraction rays. The highest intensity of crystalline diffraction rays observed at a 2θ value of 40° or more and 70° or less is preferably 100 times or more and more preferably 5 times or less of the diffraction ray intensity of the peak in the broad diffusion band observed at a 2θ value of 20° or more and 40° or less, and the amorphous oxides particularly preferably do not have any crystalline diffraction rays.

Among the amorphous oxides and the group of compounds made of chalcogenide are more preferably amorphous oxides of semi-metal elements and chalcogenide, and particularly preferably oxides made of one kind of elements belonging to Group XIII (IIIB) to XV (VB) of the periodic table, Al, Ga, Si, Sn, Ge, Pb, Sb, and Bi and a combination of two or more kinds thereof. Specific examples of preferred amorphous oxides and chalcogenide include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, $SnSiS_3$, and the like. In addition, these may be complex oxides with lithium oxide, for example, $Li_2SnO_2$.

The average particle size of the negative electrode active material is preferably 0.1 μm to 60 μm. In order to provide a predetermined particle size, an ordinary crusher or classifier may be used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be used.

The concentration of the negative electrode active material is not particularly limited, but is preferably 10 to 80% by mass and more preferably 20 to 70% by mass with respect to 100% by mass of the solid components in the solid electrolyte composition.

The mass (mg) (basis weight) of the negative electrode active material per unit area ($cm^2$) of the negative electrode active material layer is not particularly limited. The mass can be arbitrarily determined depending on the designed battery capacity.

The negative electrode active material may be used singly or two or more negative electrode active materials may be used in combination.

<Collector (Metal Foil)>

The collectors of positive electrodes and negative electrodes are preferably electron conductors. The collector of the positive electrode is preferably a collector obtained by treating the surface of an aluminum or stainless steel collector with carbon, nickel, titanium, or silver in addition to an aluminum collector, a stainless steel collector, a nickel collector, a titanium collector, or the like, and, among these, an aluminum collector and an aluminum alloy collector are more preferred. The collector of the negative electrode is preferably an aluminum collector, a copper collector, a stainless steel collector, a nickel collector, or a titanium collector and more preferably an aluminum collector, a copper collector, or a copper alloy collector.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 μm to 500 μm. In addition, the surface of the collector is preferably provided with protrusions and recesses by means of a surface treatment.

<Production of All-solid State Secondary Battery>

The all-solid state secondary battery may be produced using an ordinary method. Specific examples thereof include a method in which the material for a positive electrode of the present invention or the solid electrolyte composition is applied onto a metal foil which serves as the collector, thereby producing an electrode sheet for an all-solid state secondary battery on which a coated film is formed.

For example, the material for a positive electrode is applied onto a metal foil which is a positive electrode collector so as to form a positive electrode active material layer, thereby producing a positive electrode sheet for an all-solid state secondary battery. The solid electrolyte composition for forming the solid electrolyte layer is applied onto the positive electrode active material layer, thereby forming a solid electrolyte layer. Furthermore, the solid electrolyte composition including the negative electrode active material is applied onto the solid electrolyte layer, thereby forming a negative electrode active material layer. A collector for the negative electrode (metal foil) is overlaid on the negative electrode active material layer, whereby it is possible to obtain a structure of an all-solid state secondary battery in which the solid electrolyte layer is sandwiched between the positive electrode active material layer and the negative electrode active material layer.

In the all-solid state secondary battery of the present invention, the electrode layers contain active materials. From the viewpoint of improving ion conductivity, the electrode layers preferably contain the inorganic solid electrolyte. In addition, from the viewpoint of improving the bonding properties between solid particles, between the electrodes, and between the electrodes and the collector, the electrode layers preferably contain the binder.

The solid electrolyte layer contains the inorganic solid electrolyte. From the viewpoint of improving the bonding properties between solid particles and between layers, the solid electrolyte layer also preferably contains the binder.

Meanwhile, the material for a positive electrode and the solid electrolyte composition may be applied using an ordinary method. At this time, the solid electrolyte composition for forming the positive electrode active material layer, the solid electrolyte composition for forming the inorganic solid electrolyte layer, and the solid electrolyte composition for forming the negative electrode active material layer may be dried after being applied respectively or may be dried after being applied into multiple layers. The drying temperature is not particularly limited. Meanwhile, the lower limit is preferably 30° C. or higher and more preferably 60° C. or higher, and the upper limit is preferably 300° C. or lower and more preferably 250° C. or lower. In a case in which the compositions are heated in the above-described temperature range, it is possible to remove the dispersion medium and form a solid state.

<Usages of All-solid State Secondary Battery>

The all-solid state secondary battery according to the present invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include automobiles, electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with solar batteries.

Among these, the all-solid state secondary battery is preferably applied to applications for which a high capacity and high-rate discharging characteristics are required. For example, in electricity storage facilities in which an increase in the capacity is expected in the future, it is necessary to satisfy both high reliability, which is essential, and furthermore, the battery performance. In addition, in electric vehicles mounting high-capacity secondary batteries and domestic usages in which batteries are charged out every day, better reliability is required against overcharging. According to the present invention, it is possible to preferably cope with the above-described use aspects and exhibit excellent effects.

According to the preferred embodiment of the present invention, individual application forms as described below are derived.

(1) Materials for a positive electrode containing a binder.

(2) Electrode sheets for an all-solid state secondary battery produced by applying the material for a positive electrode onto a metal foil and forming a positive electrode active material layer.

(3) Electrode sheets for an all-solid state secondary battery produced by applying the material for a positive electrode onto a metal foil so as to form a positive electrode active material layer, applying a solid electrolyte composition onto the positive electrode active material layer so as to form a solid electrolyte layer, and applying a solid electrolyte composition including a negative electrode active material on the solid electrolyte layer so as to form a negative electrode active material layer.

(4) Methods for manufacturing an electrode sheet for an all-solid state secondary battery in which the material for a positive electrode is applied onto a metal foil, and a film is formed.

(5) Methods for manufacturing an all-solid state secondary battery in which a positive electrode active material layer is produced by applying a slurry in which a sulfide-based inorganic solid electrolyte is dispersion using a non-aqueous dispersion medium in a wet manner.

Meanwhile, examples of the methods for the material for a positive electrode or the solid electrolyte composition onto a metal foil include coating (preferably wet-type coating), spray coating, spin coating, dip coating, slit coating, stripe coating, and bar coating.

All-solid state secondary batteries refer to secondary batteries having a positive electrode, a negative electrode, and an electrolyte which are all constituted of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (high-molecular-weight) all-solid state secondary batteries in which a high-molecular-weight compound such as polyethylene oxide is used as an electrolyte and inorganic all-solid state secondary batteries in which the Li—P—S, LLT, LLZ, or the like is used. Meanwhile, the application of high-molecular-weight compounds to inorganic all-solid state secondary batteries is not inhibited, and high-molecular-weight compounds can also be applied as binders of positive electrode active materials, negative electrode active materials, and inorganic solid electrolyte particles.

Inorganic solid electrolytes are differentiated from electrolytes in which the above-described high-molecular-weight compound is used as an ion conductive medium (high-molecular-weight electrolyte), and inorganic compounds serve as ion conductive media. Specific examples thereof include the Li—P—S, LLT, and LLZ. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes; however, when differentiated from electrolytes as the ion transportation materials, the materials are referred to as "electrolyte salts" or "supporting electrolytes". Examples of the electrolyte salts include lithium bis-trifluoromethanesulfonimide (LiTFSI).

In the present invention, "materials for a positive electrode" or "compositions" refer to mixtures obtained by uniformly mixing two or more components. Here, compositions may partially include agglomeration or uneven distribution as long as the compositions substantially maintain uniformity and exhibit desired effects.

EXAMPLES

Hereinafter, the present invention will be described in more detail on the basis of examples. Meanwhile, the present invention is not interpreted to be limited thereto. In the following examples, "parts" and "%" are mass-based unless particularly otherwise described.

(Measurement of Specific Surface Area of Auxiliary Conductive Agent)

The specific surface area of the auxiliary conductive agent was measured using a specific surface area measurement instrument BELSORP-mini (trade name, manufactured by BEL Japan, Inc.).

(Measurement of Lc of Auxiliary Conductive Agent)

Lc of the auxiliary conductive agent was measured by measuring a 002 diffraction line using an X-ray diffraction device RINT2500 (trade name, manufactured by Rigku Corporation) and calculating the length (Lc) of the crystallite in a 002 plane using the Kakushin method.

(Measurement of Volume-average Particle Diameter of Auxiliary Conductive Agent)

The average particle diameter of the auxiliary conductive agent was measured in the following order. 0.1% by mass of a dispersion liquid was prepared using auxiliary conductive agent particles and a dispersion medium shown in Table 1 in a 20 ml sample bottle by means of dilution. The diluted dispersion specimen was irradiated with 1 kHz ultrasonic waves for 10 minutes and was then immediately used for testing. Data capturing was carried out 50 times using this dispersion liquid specimen, a laser diffraction/scattering-type particle size distribution measurement instrument LA-920 (trade name, manufactured by Horiba Ltd.), and a silica cell for measurement at 25° C., thereby obtaining the volume-average particle diameter. (Regarding other detailed conditions and the like, the description of JIS Z8828:2013 "Particle size analysis-Dynamic light scattering method" was referred to as necessary.) Five specimens were produced per level, and the average values thereof were employed.

Synthesis of Sulfide-based Inorganic Solid Electrolyte (Li—P—S-based Glass)

A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, injected into an agate mortar, and mixed using the agate mortar for five minutes. Meanwhile, the molar ratio between $Li_2S$ and $P_2S_5$ was set to 75:25.

66 zirconia beads having a diameter of 5 mm were injected into a 45 mL zirconia container (manufactured by Fritsch Japan Co., Ltd.), then, the full amount of the mixture of the lithium sulfide and the diphosphorus pentasulfide was injected thereinto, and the container was sealed in an argon atmosphere. The container was set in a planetary ball mill P-7 (trade name, manufactured by Fritsch Japan Co., Ltd.), mechanical milling was carried out at a temperature of 25° C. and a rotation speed of 510 rpm for 20 hours, thereby obtaining yellow powder (6.20 g) of Li—P—S-based glass (sulfide-based inorganic solid electrolyte material).

Examples

Preparation of Material for Positive Electrode (P-1)

180 zirconia beads having a diameter of 5 mm were injected into a 45 mL zirconia container (manufactured by Fritsch Japan Co., Ltd.), and the Li—P—S-based glass synthesized above (3.0 g) and isobutyronitrile (12.3 g) as a dispersion medium were injected thereinto. The container was set in a planetary ball mill P-7 manufactured by Fritsch Japan Co., Ltd., the components were continuously stirred at a temperature of 25° C. and a rotation speed of 300 rpm for two hours, then, $LiCoO_2$ (LCO, manufactured by Nippon Chemical Industrial Co., Ltd.) (6.5 g) as an active material, acetylene black (manufactured by Denka Company Limited) (495 mg) as an auxiliary conductive agent, and propyl benzoate (manufactured by Tokyo Chemical Industry Co., Ltd., corresponding to Exemplary Compound D-1) (5 mg) were injected into the container, similarly, the container was set in the planetary ball mill P-7, and the components were continuously mixed at a temperature of 25° C. and a rotation speed of 100 rpm for 10 minutes, thereby preparing a material for a positive electrode (P-1).

Preparation of Materials for Positive Electrode (P-2) to (P-10) and (CP-1) and (CP-2)

Materials for a positive electrode (P-2) to (P-10) and (CP-1) and (CP-2) were prepared using the same method as for the material for a positive electrode (P-1) except for the fact that the compositions were changed as shown in Table 1. Meanwhile, the amount of the dispersion medium used was 12.3 g for all of the materials like the material for a positive electrode (P-1).

The components of the materials for a positive electrode are summarized in Table 1.

Here, the materials for a positive electrode (P-1) to (P-10) are the material for a positive electrode of the present invention, and (CP-1) and (CP-2) are comparative materials for a positive electrode.

TABLE 1

| Material for positive electrode | Solid electrolyte Kind | % by mass | Active material Kind | % by mass | Auxiliary conductive agent Kind | % by mass | Dispersant Kind | % by mass | Dispersion medium Kind |
|---|---|---|---|---|---|---|---|---|---|
| P-1 | Li—P—S | 30 | LCO | 65 | AB | 4.95 | D-1 | 0.05 | Isobutyronitrile |
| P-2 | Li—P—S | 30 | LCO | 65 | VGCF | 4.95 | D-3 | 0.05 | Isobutyronitrile |
| P-3 | Li—P—S | 30 | NMC | 65 | CGB20 | 4.95 | D-9 | 0.05 | Isobutyronitrile |
| P-4 | Li—P—S | 30 | NMC | 65 | CGB20 | 4.95 | D-10 | 0.05 | Heptane |
| P-5 | Li—P—S | 30 | NMC | 65 | CDK01 | 4.95 | D-13 | 0.05 | Isobutyronitrile |
| P-6 | Li—P—S | 30 | NCA | 65 | CDK01 | 4.95 | D-18 | 0.05 | Heptane |
| P-7 | Li—P—S | 30 | NCA | 65 | CDK01 | 4.95 | D-24 | 0.05 | Isobutyronitrile |
| P-8 | Li—P—S | 30 | NCA | 65 | CDK02 | 4.95 | D-27 | 0.05 | Heptane |
| P-9 | Li—P—S | 30 | NCA | 65 | CDK02 | 4.95 | D-31 | 0.05 | Isobutyronitrile |
| P-10 | Li—P—S | 30 | NCA | 65 | CDK02 | 4.95 | D-35 | 0.05 | Heptane |
| CP-1 | Li—P—S | 30 | LCO | 65 | AB | 5 | — | — | Isobutyronitrile |
| CP-2 | Li—P—S | 30 | LCO | 65 | VGCF | 5 | — | — | Heptane |

<Notes of Table 1>
(1) Li—P—S: Li—P—S-based glass synthesized above
(2) LCO: LiCoO$_2$, lithium cobaltate, manufactured by Nippon Chemical Industrial Co., Ltd.
(3) NMC: LiNi$_{0.33}$Co$_{0.33}$Mn$_{0.33}$O$_2$, lithium nickel manganese cobalt oxide
(4) NCA: LiNi$_{0.80}$Co$_{0.15}$Al$_{0.05}$O$_2$, lithium nickel cobalt aluminum oxide
(5) AB: Acetylene black, manufactured by Denka Company Limited
(6) VGCF: vapor-grown carbon fiber, manufactured by Showa Denko K.K.
(7) CGB20: trade name, manufactured by Nippon Kokuen Group
(8) CDK01: trade name, manufactured by Chuo Denki Kogyo Co., Ltd.
(9) CDK02: trade name, manufactured by Chuo Denki Kogyo Co., Ltd.
(10) Kind of dispersant: Exemplary Compounds described above Preparation of Solid Electrolyte Composition 180 zirconia beads having a diameter of 5 mm were injected into a 45 mL zirconia container (manufactured by Fritsch Japan Co., Ltd.), and the Li—P—S-based glass synthesized above (10.0 g) and isobutyronitrile (15.0 g) as a dispersion medium were injected thereinto. After that, the container was set in a planetary ball mill P-7 manufactured by Fritsch Japan Co., Ltd., and the components were continuously stirred at a temperature of 25° C. and a rotation speed of 300 rpm for two hours, thereby preparing a solid electrolyte composition.

Preparation of Composition for Negative Electrode of All-solid State Secondary Battery (Material for Negative Electrode)

180 zirconia beads having a diameter of 5 mm were injected into a 45 mL zirconia container (manufactured by Fritsch Japan Co., Ltd.), and the Li—P—S-based glass synthesized above (4.0 g) and isobutyronitrile (12.3 g) as a dispersion medium were injected thereinto. The container was set in a planetary ball mill P-7 manufactured by Fritsch Japan Co., Ltd., the components were continuously stirred at a temperature of 25° C. and a rotation speed of 300 rpm for two hours, then, CGB20 (manufactured by Nippon Kokuen Group) (6.0 g) was injected into the container as an active material, similarly, the container was set in the planetary ball mill P-7, and the components were continuously mixed at a temperature of 25° C. and a rotation speed of 200 rpm for 15 minutes, thereby preparing a material for a negative electrode.

Production of Negative Electrode Sheet for All-solid State Secondary Battery

The material for a negative electrode prepared above was applied onto a 20 μm-thick aluminum foil using an applicator having an adjustable clearance, was heated at 80° C. for one hour, and then was further heated at 110° C. for one hour, thereby drying the coating solvent. After that, the material was heated and pressurized (at 10 MPa for one minute) using a heat pressing machine, thereby producing a negative electrode active material layer.

The solid electrolyte composition prepared above was applied onto the negative electrode active material layer produced above using an applicator having an adjustable clearance, was heated at 80° C. for one hour, and then was further heated at 110° C. for six hours. A sheet having a solid electrolyte layer formed on the negative electrode active material layer was heated and pressurized (at 15 MPa for one minute) using a heat pressing machine, thereby producing a negative electrode sheet for an all-solid state secondary battery.

Production of Positive Electrode Sheet for All-solid State Secondary Battery

The material for a positive electrode prepared above (P-1) was applied onto a 20 μm-thick aluminum foil using an applicator having an adjustable clearance, was heated at 80° C. for one hour, and then was further heated at 110° C. for one hour, thereby drying the dispersion medium. After that, the material was heated and pressurized (at 10 MPa for one minute) using a heat pressing machine, thereby producing a positive electrode sheet for an all-solid state secondary battery.

Manufacturing of All-solid State Secondary Battery

A disc-shaped piece having a diameter of 14.5 mm was cut out from the negative electrode sheet for an all-solid state secondary battery manufactured above and was put into a 2032-type stainless steel coin case into which a spacer and a washer were combined so that the surface of a disc-shaped piece having a diameter of 13.0 mm cut out from the positive electrode sheet for an all-solid state secondary battery which was coated with the material for a positive electrode and the solid electrolyte layer faced each other, thereby manufacturing all-solid state secondary batteries (coin batteries) of Test Nos. 101 to 110 and c11 and c12 shown in Table 2 in which an all-solid state secondary battery having the structure illustrated in FIG. 1 was accommodated in the coin case.

In the all-solid state secondary batteries, the positive electrode active material layers, the negative electrode active material layers, and the solid electrolyte layers respectively had the film thicknesses shown in Table 2.

On the all-solid state secondary batteries of Test Nos. 101 to 110 and c11 and c12 manufactured above, the following evaluations were carried out.

<Measurement of Discharge Capacity>

The discharge capacity of the all-solid state secondary battery manufactured above was measured using a charging and discharging evaluation device "TOSCAT-3000 (trade name)" manufactured by Toyo System Co., Ltd.

The all-solid state secondary battery was charged at a current value of 0.2 mA until the battery voltage reached 4.2 V and was discharged at a current value of 0.2 mA until the battery voltage reached 3.0 V. The above-described process was considered as one cycle, charging and discharging were repeatedly carried out in the same manner, and the discharge capacity in the third cycle was considered as the discharge capacity of the battery. In Table 2, the discharge capacity is expressed as "capacity". Meanwhile, the discharge capacities of 1.5 mAh or more are the passing levels of the present testing.

<Evaluation of Output Characteristics>

The output characteristics of the all-solid state secondary battery manufactured above were measured using a charging and discharging evaluation device "TOSCAT-3000 (trade name)" manufactured by Toyo System Co., Ltd.

The all-solid state secondary battery was charged at a current value of 0.05 mA until the battery voltage reached 3.8 V and then discharged at 0.05 mA for ten seconds, and the voltage value after the 10-second discharging was read.

Similarly, the all-solid state secondary battery was charged at a current value of 0.05 mA and discharged at individual current values of 0.1 mA, 0.2 mA, and 0.5 mA, and the voltage value after the 10-second discharging was read.

The voltages were indicated along the vertical axis, the current values were indicated along the horizontal axis, and "the amount of a current when the all-solid state secondary battery is charged at a current value of 0.05 mA until the battery voltage reaches 3.8 V and the voltage reaches 2.5 V after 10-second discharging" was obtained on the basis of the respective current values (0.05 mA, 0.1 mA, 0.2 mA, and 0.5 mA) and the respective voltage values read after the 10-second discharging at the respective current values by means of extrapolation. The output was calculated from (2.5 V)×(the current value obtained by means of extrapolation) and was evaluated using the following standards. Meanwhile, rankings of "C" or higher are passing levels of the present testing.

(Evaluation Standards)
A: 50 mW or more
B: 40 mW or more and less than 50 mW
C: 20 mW or more and less than 40 mW
D: Less than 20 mW

TABLE 2

| Test No. | Kind | Positive electrode active material layer | | Solid electrolyte layer | Negative electrode active material layer | | Characteristic values of auxiliary conductive agent | | | Battery evaluation | |
|---|---|---|---|---|---|---|---|---|---|---|---|
| | | Basis weight (mg/cm$^2$) | Film thickness (μm) | Film thickness (μm) | Basis weight (mg/cm$^2$) | Film thickness (μm) | Specific surface area (m$^2$/g) | Lc (Angstrom) | Particle diameter (μm) | Capacity (mAh) | Output characteristics |
| 101 | P-1 | 12.4 | 62 | 40 | 8.0 | 60 | 70 | 35 | 0.04 | 1.5 | C |
| 102 | P-2 | 12.4 | 60 | 45 | 8.0 | 60 | 13 | 400 | 10 | 1.9 | B |
| 103 | P-3 | 12.3 | 60 | 40 | 8.0 | 60 | 4 | 650 | 20 | 2.3 | A |
| 104 | P-4 | 12.4 | 61 | 45 | 8.0 | 60 | 4 | 650 | 20 | 2.1 | A |
| 105 | P-5 | 12.5 | 60 | 40 | 8.0 | 60 | 1 | 730 | 30 | 2.5 | A |
| 106 | P-6 | 12.4 | 63 | 50 | 8.0 | 60 | 1 | 730 | 30 | 2.3 | A |
| 107 | P-7 | 12.3 | 61 | 40 | 8.0 | 60 | 1 | 730 | 30 | 2.1 | A |
| 108 | P-8 | 12.4 | 60 | 45 | 8.0 | 60 | 1 | 700 | 20 | 2.5 | A |
| 109 | P-9 | 12.3 | 62 | 50 | 8.0 | 60 | 1 | 700 | 20 | 2.5 | A |
| 110 | P-10 | 12.3 | 60 | 40 | 8.0 | 60 | 1 | 700 | 20 | 2.3 | A |
| c11 | CP-1 | 12.4 | 65 | 45 | 8.0 | 60 | 70 | 35 | 0.04 | 1.1 | D |
| c12 | CP-2 | 12.4 | 63 | 50 | 8.0 | 60 | 13 | 400 | 10 | 1.4 | D |

<Notes of Table 2>
"Basis weight" indicates the mass (mg) of the active material per unit area (cm$^2$) of the active material layer.

As is clear from Table 2, it is found that the all-solid state secondary batteries of Test Nos. 101 to 110 which satisfied the regulations of the present invention had a large discharge capacity and excellent output characteristics.

In contrast, the all-solid state secondary batteries of Test Nos. c11 and c12 which were produced using the material for a positive electrode not containing the dispersant failed to reach the passing level in terms of both the discharge capacity and the output characteristics.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery
11: coin case
12: all-solid state secondary battery
13: all-solid state secondary battery (coin battery)

What is claimed is:

1. A material for a positive electrode comprising:
a positive electrode active material:
an inorganic solid electrolyte having conductivity of ions of metals belonging to Group I or II of the periodic table;
an auxiliary conductive agent; and
a dispersant including a compound having a functional group equivalent of 30 to 3,000 and having at least one selected from a group of functional groups (I),
group of functional groups (I): acidic groups, (meth) acryloyl groups, (meth)acryloyloxy groups, (meth) acrylamide groups, alkoxysilyl groups, epoxy groups, oxetanyl groups, isocyanate groups, cyano groups, and mercapto groups,
wherein the compound is a compound represented by General Formula (D) or a compound including a structure in which at least one hydrogen atom in the compound is substituted with a bond,

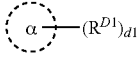

General Formula (D)

in General Formula (D), ring α represents a condensed polycycle, $R^{D1}$ represents a substituent bonded to a constituent atom of the ring α, and d1 represent an integer of 1 or more, in a case in which d1 is 2 or more, a plurality of $R^{D1}$'s may be identical to or different from each other, in addition, two $R^{D1}$'s substituting the same atom may be bonded to each other and thus form =O or an alkylidene group, and $R^{D1}$'s substituting atoms adjacent to each other may be bonded to each other and thus form a ring, provided that, in a case in which an epoxy ring or an oxetane ring is not condensed into the ring α, at least one $R^{D1}$ is a functional group selected from the group of functional groups (I) or a group including the functional group.

2. The material for a positive electrode according to claim 1, wherein a specific surface area of the auxiliary conductive agent is 50 m²/g or less.

3. The material for a positive electrode according to claim 1, wherein the auxiliary conductive agent is made of a carbon material, and a length Lc of a crystallite in a c-axis direction of the carbon material is 100 angstroms or more.

4. The material for a positive electrode according to claim 1, wherein 0.01% to 10% by mass of the auxiliary conductive agent is included.

5. The material for a positive electrode according to claim 1, wherein an average particle diameter of the auxiliary conductive agent is 0.1 to 50 μm.

6. The material for a positive electrode according to claim 1, wherein the inorganic solid electrolyte is a sulfide-based inorganic solid electrolyte.

7. The material for a positive electrode according to claim 1, wherein the ring α is a condensed polycyclic hydrocarbon ring of three or more rings into which an epoxy ring or an oxetane ring may be condensed.

8. The material for a positive electrode according to claim 1, wherein 0.01% to 10% by mass of the dispersant is included with respect to the auxiliary conductive agent.

9. An electrode sheet for an all-solid state secondary battery produced by applying the material for a positive electrode according to claim 1 onto a metal foil.

10. An all-solid state secondary battery comprising:
a positive electrode active material layer;
a negative electrode active material layer; and
an inorganic solid electrolyte layer,
wherein the positive electrode active material layer is produced by applying the material for a positive electrode according to claim 1 to form a layer.

11. A method for manufacturing an electrode sheet for an all-solid state secondary battery, the method comprising:
applying the material for a positive electrode according to claim 1 onto a metal foil to form a film.

12. A method for manufacturing an all-solid state secondary battery, the method comprising:
manufacturing an all-solid state secondary battery through the manufacturing method according to claim 11.

* * * * *